United States Patent
Andersson et al.

(10) Patent No.: US 7,735,471 B2
(45) Date of Patent: Jun. 15, 2010

(54) CONTROLLING A LIGHT-DUTY COMBUSTION ENGINE

(75) Inventors: Martin N. Andersson, Caro, MI (US); George M. Pattullo, Caro, MI (US); Thomas L. Schmidt, Cass City, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 12/173,849

(22) Filed: Jul. 16, 2008

(65) Prior Publication Data
US 2010/0012084 A1    Jan. 21, 2010

(51) Int. Cl.
*F02P 5/00*  (2006.01)
*F02M 51/00*  (2006.01)
(52) U.S. Cl. .................. 123/406.54; 123/491; 123/492
(58) Field of Classification Search ............ 123/406.54, 123/472, 491, 492
See application file for complete search history.

(56) References Cited

U.S. PATENT DOCUMENTS

| | | | | |
|---|---|---|---|---|
| 4,553,517 A | * | 11/1985 | Andreasson | 123/329 |
| 5,050,553 A | * | 9/1991 | Erhard | 123/406.54 |
| 5,205,255 A | * | 4/1993 | Yamagata et al. | 123/331 |
| 6,467,456 B2 | * | 10/2002 | Shidara et al. | 123/406.54 |
| 6,820,576 B2 | * | 11/2004 | Kishibata et al. | 123/3 |
| 7,000,595 B2 | | 2/2006 | Andersson et al. | |
| 7,198,028 B2 | | 4/2007 | Andersson et al. | |
| 2007/0282514 A1 | * | 12/2007 | Jarrix et al. | 701/96 |
| 2009/0193669 A1 | * | 8/2009 | Gorenflo | 30/382 |

FOREIGN PATENT DOCUMENTS

WO    WO2007004936 A1    1/2007

* cited by examiner

*Primary Examiner*—Stephen K Cronin
*Assistant Examiner*—David Hamaoui
(74) *Attorney, Agent, or Firm*—Reising Ethington P.C.

(57) ABSTRACT

A method and system for controlling a light-duty combustion engine and, more particularly, a method and system that use an engine speed governor to limit the engine speed to a level that is less than a clutch-in speed of a centrifugal clutch. If it is determined that an operator is attempting to throttle or accelerate the engine, the engine speed governor is disengaged so that normal operation can commence.

16 Claims, 5 Drawing Sheets

CONTROLLING A LIGHT-DUTY COMBUSTION ENGINE

FIELD OF THE INVENTION

The present invention relates generally to controlling a light-duty combustion engine, and more specifically, to using an engine speed governor to limit the speed of the engine to a level that is less than a clutch-in speed of a centrifugal clutch.

BACKGROUND OF THE INVENTION

Light-duty combustion engines may be used in hand-held tools and other pieces of equipment that have rotating, reciprocating, or otherwise moving parts. In order to prevent these tools from engaging immediately upon startup, they may be equipped with centrifugal clutches that only engage once the engine speed exceeds a predetermined clutch-in speed.

For example, consider the case of a gas-powered weed trimmer having a rotating trim line that can be used to cut grass, weeds, plants, etc. The weed trimmer can be equipped with a centrifugal clutch that prevents rotation of the trim line when the engine is operating below a certain speed. This way, when an operator initially starts the engine—a period when the operator may not be fully prepared for the tool to start rotating—the engine can warm up without the trim line rotating. Once the operator is ready for normal operation, the engine can be brought up to a speed that is sufficient to engage the centrifugal clutch and begin spinning the trim line.

SUMMARY OF THE INVENTION

According to one aspect, there is provided a method for controlling a light-duty combustion engine. The method generally comprises the steps of: (a) activating an engine speed governor; (b) limiting the speed of the light-duty combustion engine with the engine speed governor; (c) sensing the speed of the light-duty combustion engine; (d) determining if the light-duty combustion engine is in an acceleration mode; and (e) if the light-duty combustion engine is in an acceleration mode, then deactivating the engine speed governor.

According to another aspect, there is provided a control system for use with a light-duty combustion engine. The control system generally comprises: an ignition discharge capacitor that is coupled to a charge winding; an ignition switching device that is coupled to the ignition discharge capacitor and includes a signal input; and an electronic processing device. Following engine startup, the control system activates an engine speed governor to limit the speed of the engine, and deactivates the engine speed governor if the control system senses that an operator is attempting to accelerate the engine.

BRIEF DESCRIPTION OF THE DRAWINGS

These and other objects, features and advantages will be apparent from the following detailed description of the preferred embodiments, appended claims and accompanying drawings in which:

DETAILED DESCRIPTION OF THE PREFERRED EMBODIMENT

Figure 1:
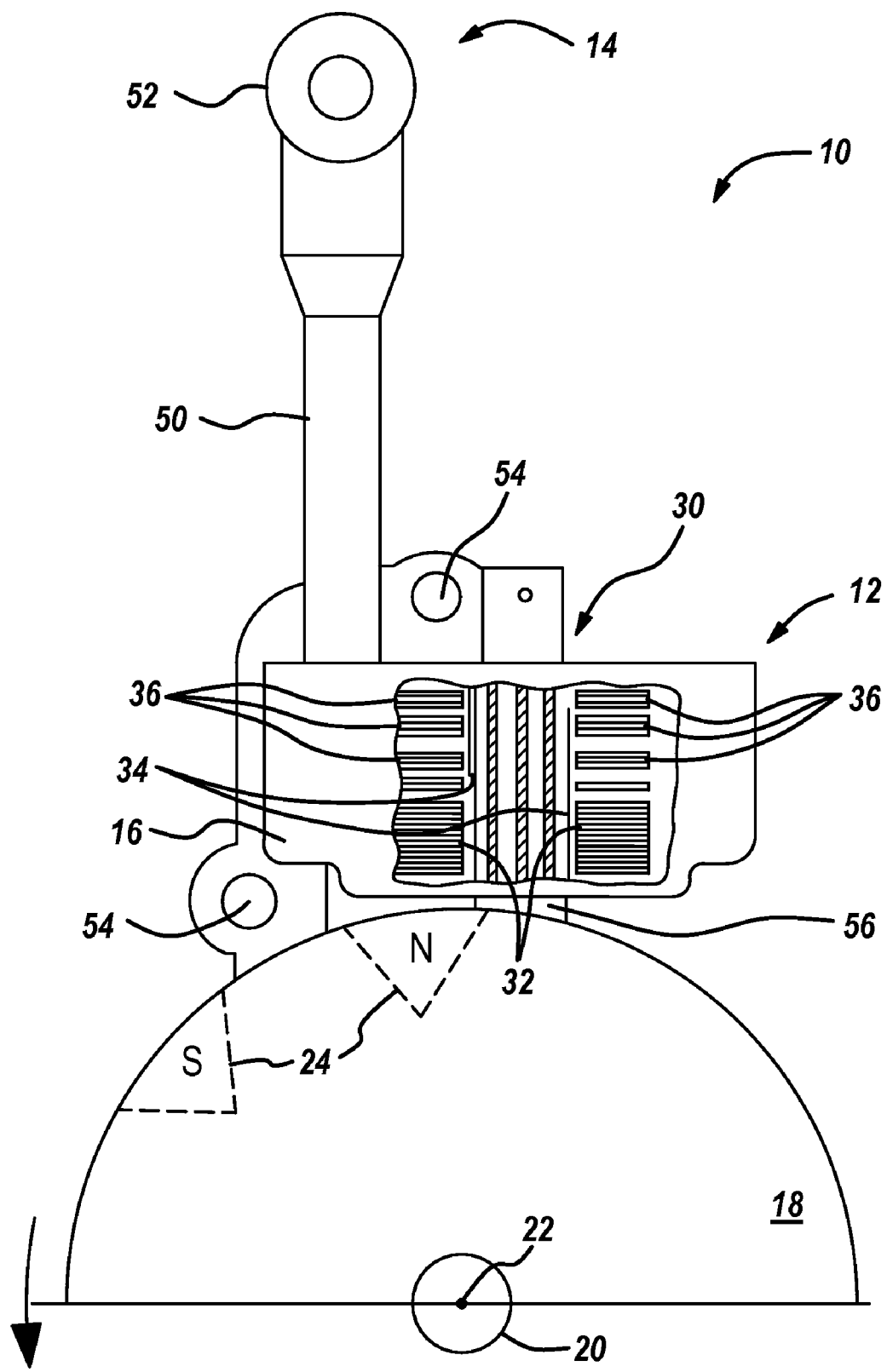
FIG. 1 is an elevation view of an exemplary embodiment of a signal generation system, including a cutaway section showing parts of a control system.
Figure 2:
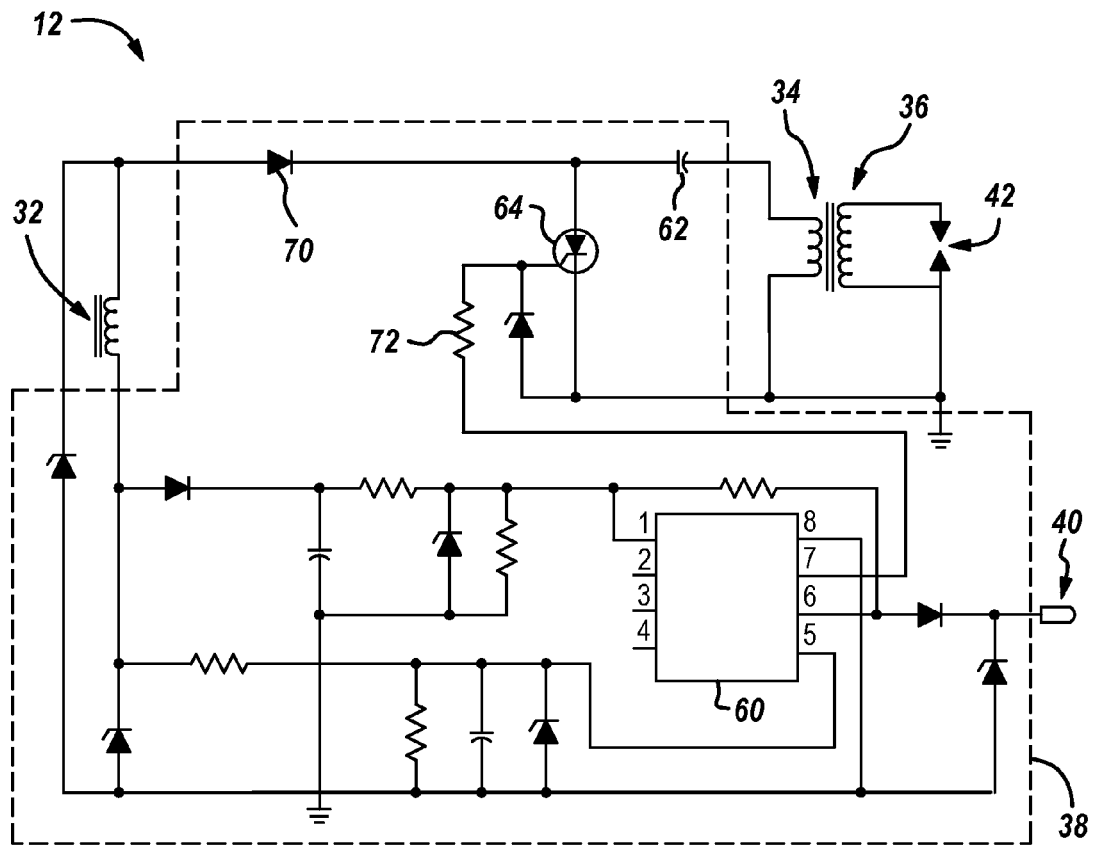
FIG. 2 is a schematic view of an exemplary embodiment of the control system of FIG. 1.

Referring to FIGS. 1 and 2, there is shown an exemplary embodiment of a signal generation system 10 that can be used with a light-duty combustion engine having a centrifugal clutch, such as the type typically employed by lawn and garden equipment. The term 'light-duty combustion engine' broadly includes all types of non-automotive combustion engines—this includes engines that are two-strokes, four-strokes, carbureted, fuel-injected, and direct-injected, to name but a few. Light-duty combustion engines may be used with hand-held power tools, lawn and garden equipment, lawnmowers, grass trimmers, edgers, chain saws, snowblowers, personal watercraft, boats, snowmobiles, motorcycles, all-terrain-vehicles, etc.

Exemplary Signal Generation System—

According to the exemplary embodiment shown here, signal generation system 10 includes a control system 12, an ignition lead 14 and a housing 16, and it interacts with a flywheel 18. The flywheel is a weighted disk-like component that is coupled to a crankshaft 20 and rotates about an axis 22 under the power of the engine. By using its rotational inertia, flywheel 18 moderates fluctuations in engine speed, thereby providing a more constant and even output. Furthermore, flywheel 18 includes magnets or magnetic sections 24 located near its outer periphery. Once the flywheel is rotating, these magnetic sections spin past and electromagnetically interact with components of control system 12 such that a signal indicative of the rotational speed of the flywheel, and hence the engine, may be induced. This signal may be used for a number of purposes and can provide information pertaining to the number of engine revolutions, the engine position, and/or the engine speed.

Control system 12 is responsible for managing the ignition of the engine and, according to the exemplary embodiment shown here, comprises a lamstack 30, a charge winding 32, a primary ignition winding 34, a secondary ignition winding 36, a control circuit 38, and a kill-switch 40. As magnetic sections 24 rotate past lamstack 30, which can include a stack of ferromagnetic or magnetically permeable laminate pieces, a magnetic field is introduced in the lamstack which causes a voltage in charge winding 32. Preferably, charge winding 32 surrounds lamstack 30 such that the lamstack is generally positioned along the center axis of the charge winding. Primary ignition winding 34 can also surround lamstack 30 and inductively interact with a secondary ignition winding 36. As is commonly known in capacitive discharge ignition (CDI) systems, a spark is created in a spark plug 42 by discharging a capacitor across primary winding 34, such that it induces a high voltage pulse in secondary winding 36. Kill-switch 40 provides the user with a quick, easy to use means for shutting off the engine and, according to an exemplary embodiment, is a 'positive stop/automatic on' type switch. A more detailed account of control system 12 is subsequently provided in conjunction with FIG. 2.

Ignition lead 14 couples control system 12 to spark plug 42 so that the control system can send high voltage ignition pulses to the spark plug, and generally includes an elongated copper wire connector 50 and a boot 52. Connector 50 conducts the high voltage ignition pulse along an electrical conductor surrounded by a protective insulated sheathing. The boot 52 is designed to receive the terminal end of the spark plug, such that the two components are both physically secured to each other and electrically connected. Of course, numerous types of boots are known to those skilled in the art and could be used to accommodate a variety of spark plug terminal ends.

Housing 16 protects the components of control system 12 from what is oftentimes a harsh operating environment. The housing, which can be made from metal, plastic or any other suitable material, surrounds lamstack 30 and allows for a small air gap 56 to exist between the lamstack and the outer periphery of flywheel 18. The air gap should be small enough to allow for sufficient electromagnetic coupling, yet large enough to account for tolerance variances during operation. The mounting features 54 shown here are holes designed to accommodate corresponding bolts, however, suitable alternative mounting features could be used in their place.

In engine operation, movement of a piston turns crankshaft 20, which in turn rotates flywheel 18. As the magnetic sections 24 of the flywheel rotate past lamstack 30, a magnetic field is created which induces a voltage in the nearby charge winding 32; this induced voltage may be used for several purposes. First, the voltage can power control circuit 38. Second, the induced voltage can charge a capacitor that stores energy until it is instructed to discharge, at which time energy is discharged across primary ignition winding 34. Lastly, the voltage induced in charge winding 32 can be used to produce an engine speed signal which is supplied to control circuit 38. This engine speed signal may play a role in the control of the engine, as will be subsequently explained in greater detail.

Exemplary Control Circuit—

Turning now to FIG. 2, there is shown an exemplary embodiment of control system 12 which includes a control circuit 38 for managing the ignition of a light-duty combustion engine. Of course, the particular control circuit embodiment shown here is but one example of the type of circuit that may be included within control system 12 and used with the present method, as other circuit embodiments could be used instead. Control circuit 38 interacts with the other elements of control system 12, and generally includes an electronic processing device 60, an ignition discharge capacitor 62, and an ignition switching device 64.

Electronic processing device 60 preferably includes one or more inputs and outputs, and is designed to execute electronic instructions that may be used to control various aspects of engine operation; this can include, for example, ignition timing, air/fuel control, etc. The term 'electronic processing device' broadly includes all types of microcontrollers, microprocessors, as well as any other type of electronic device capable of executing electronic instructions. In the particular arrangement shown here, pin 1 is coupled to charge winding 32 via a resistor and diode, such that an induced voltage in the charge winding supplies electronic processing device 60 with power. Also, when a voltage is induced in the charge winding 32, as previously described, current passes through a diode 70 and charges ignition discharge capacitor 62, assuming ignition switching device 64 is in a non-conductive state. The ignition discharge capacitor 62 may hold the charge until electronic processing device 60 changes the state of ignition switching device 64, at which time the energy stored in the capacitor is discharged. Pin 5 is also coupled to charge winding 32 and receives an electronic signal representative of the engine speed. Pin 6 may be coupled to kill switch 40, which acts as a manual override for shutting down the engine. Pin 7 is coupled to the gate of ignition switching device 64 via a resistor 72, and transmits an ignition signal which controls the state of the switching device. Lastly, pin 8 provides the electronic processing device with a ground reference.

In operation, charge winding 32 experiences an induced voltage that charges ignition discharge capacitor 62, and provides electronic processing device 60 with power and an engine speed signal. As capacitor 62 is being charged, the electronic processing device 60 may execute a series of electronic instructions that utilize the engine speed signal to determine if and how much of a spark advance or retard is needed. Electronic processing device 60 can then output an ignition signal on pin 7, according to the calculated ignition timing, which turns on switching device 64. Once turned on (meaning a conductive state), a current path through switching device 64 and primary winding 34 is formed for the charge stored in capacitor 62. The current through the primary winding induces a high voltage ignition pulse in secondary winding 36. This high voltage pulse is then delivered to spark plug 42 where it arcs across the spark gap, thus beginning the combustion process. If at any time kill switch 40 is activated, the electronic processing device stops and thereby prevents the control system from delivering a spark to the combustion chamber.

It should be appreciated that the method and system described below could be used with one of a number of light-duty combustion engine arrangements, and are not specifically limited to the exemplary systems, circuits, etc. previously described.

Exemplary Method for Controlling Light-Duty Combustion Engine—

The following description is generally directed to a method for controlling a light-duty combustion engine and, more specifically, to a method that uses an engine speed governor to limit the engine speed so that it is less than a clutch-in speed of a centrifugal clutch. If it is determined that an operator is attempting to throttle the engine, the engine speed governor is disengaged so that normal operation can commence.

Figure 3:
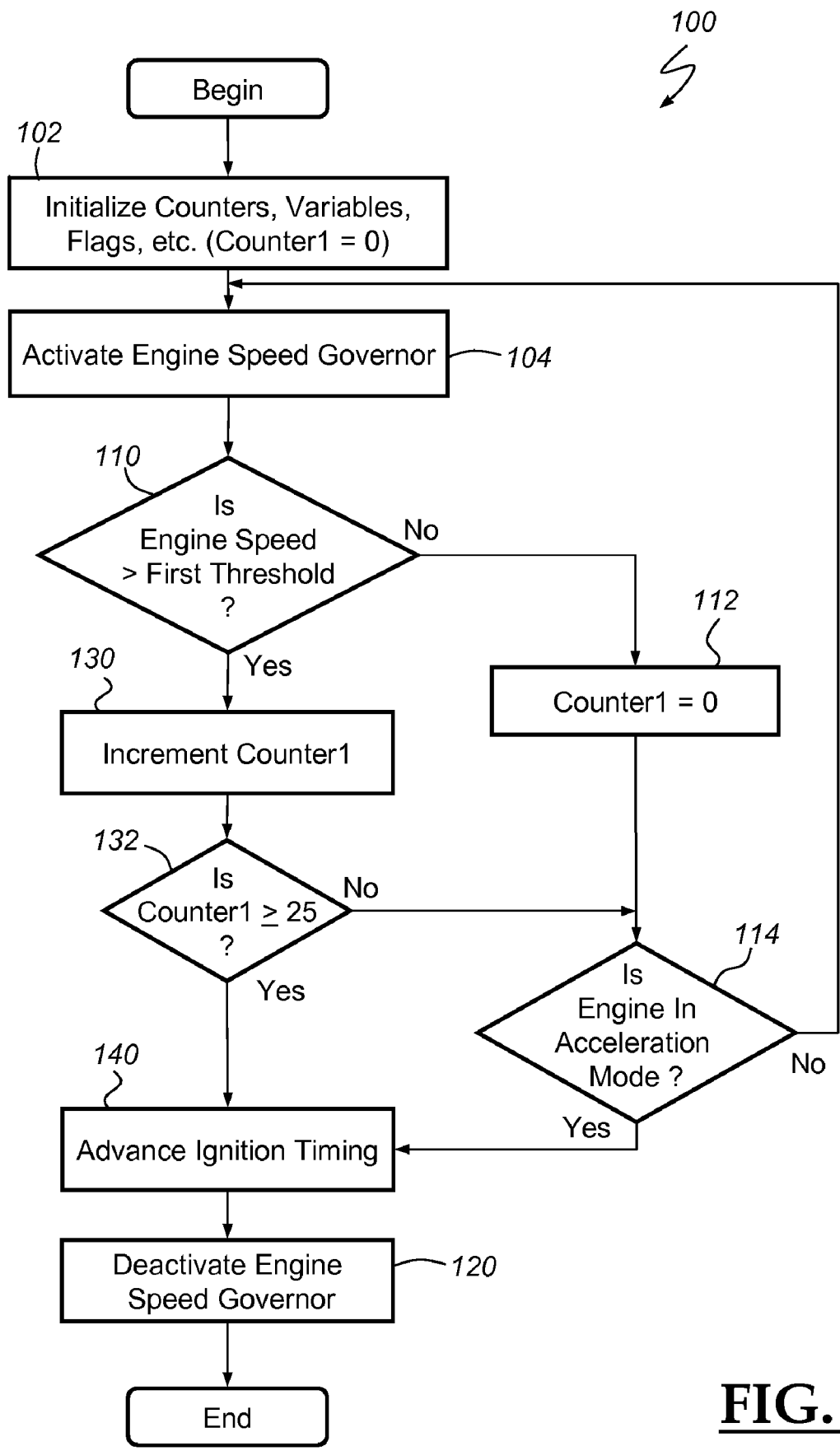
FIG. 3 is a flowchart showing an exemplary embodiment of a method for controlling a light-duty engine, where the exemplary embodiment uses an engine speed governor to limit the speed of the engine.

Skilled artisans will appreciate that the exemplary method shown in FIG. 3 may be used at start-up or at some other time, and it is only one of a number of different methods that may be used to control the light-duty combustion engine. For example, the exemplary method may be used in conjunction with any combination of additional operating sequences designed to optimally control the ignition timing under certain operating conditions. Some examples of suitable operating sequences that could be used with the exemplary method include those disclosed in U.S. Pat. No. 7,198,028, which is also assigned to present assignee. Because various operating sequences are already known in the art, a duplicative description of them has been omitted here.

With reference to FIG. 3, there is shown a flowchart detailing some of the steps of an exemplary method 100 for controlling a light-duty combustion engine. Method 100 may be executed immediately following start-up of the engine, after an initial operating sequence such as a Cranking sequence (see U.S. Pat. No. 7,198,028 for more details), or at any other time when it is desirable to maintain the engine speed below a certain level, such as a clutch-in speed of a centrifugal clutch. Although method 100 is described below in the context of a fast idle start-up operating sequence—i.e., a stand-alone operating sequence specifically designed to warm up the engine by operating it at speeds between idle and wide open throttle (WOT)—it should be appreciated that the exemplary method could be part of a different stand-alone operating sequence or it could be integrated into a larger operating sequence, to cite a few possibilities.

In step 102, one or more counters, variables, flags, etc. may be initialized. According to this particular embodiment, an engine revolution counter (Counter1) is set to '0'. Of course, other counters, variables, flags, etc. could also be set to some initial value.

Next, step 104 activates an engine speed governor that limits the engine speed to a level that is less than the clutch-in speed of a centrifugal clutch. There are a variety of ways in which this step could be performed. According to one embodiment, the engine speed governor determines the ignition timing based on the current engine speed, and does so in a way that encourages the engine speed to remain below a certain value referred to as a first threshold. If the engine speed approaches the first threshold, which is preferably less than the clutch-in speed, then a significant ignition timing retard may be used to maintain the engine speed below the clutch-in speed.

For instance, consider the example where a centrifugal clutch has a clutch-in speed of approximately 4,000 RPM and the engine speed governor uses a first threshold of 3,500 RPM. The engine speed governor may use a look-up table or the like to determine the ignition timing based on sensed engine speeds. In one embodiment, the look-up table could provide a modest ignition timing retard (e.g., 5° after top dead center (ATDC)) for most of the engine speed range, but provide a more significant ignition timing retard (e.g., 15° (ATDC)) when the engine is operating between 3,500-4,000 RPM. This rapid change in the ignition timing is intended to encourage the engine to stay below the first threshold, and hence the clutch-in speed of the centrifugal clutch. The significant timing retard preferably retards the ignition timing by at least 10°, for example, relative to the modest ignition timing retard used for the rest of the engine speed range. A significant timing retard such as this may be helpful if the engine speed wanders above the first threshold, such as when the engine ingests an air bubble from the carburetor. On the other hand, a quick and pronounced increase in engine speed, such as when the operator opens the throttle of the engine, preferably causes the engine speed governor to deactivate. In this way, the engine speed governor encourages the engine to remain at speeds below the clutch-in speed but does not work against an operator who is throttling the engine. These features will be subsequently explained in more detail.

It should be appreciated, that the engine speed governor could employ techniques other than ignition timing manipulation to limit the engine speed. For example, it is possible for the engine speed governor to temporarily prevent sparks from being sent to the spark plug, to manipulate the air and/or fuel supply, or to employ some other engine speed limiting technique known in the art.

Next, step 110 determines if the engine speed is greater than the first threshold (3,500 RPM in the example above). One potential reason for performing this step is to try and determine if the operator is engaging the throttle. As previously mentioned, the engine speed governor is initially activated in order to prevent the tool from spinning during a warm-up phase when the operator may not be ready for safe operation. Once an operator engages the tool, however, it can be assumed that they are ready to operate the device and the engine speed governor can be deactivated. According to this exemplary embodiment, method 100 uses multiple tests to determine when a user is engaging the throttle so that the engine speed governor can be deactivated at the appropriate moment. The first of these tests relates to step 110, and the second of these tests relates to step 114. If the answer to step 110 is 'no', then the method proceeds to step 112 which resets Counter1 to '0'. It should be appreciated that the particular order of these steps could differ from the exemplary embodiment shown here.

Even if the engine is operating below the first threshold, it is still possible that the operator is attempting to engage the throttle. For instance, if the engine is cold or if it ingests a concentrated fuel charge, the speed of the engine could temporarily slow below the first threshold and cause step 110 to output a 'no' response. Therefore, step 114 acts as a second test or check to try and discern the operator's intent. In this particular embodiment, step 114 determines if the light-duty combustion engine is in an 'acceleration mode'. It should be understood that one of a number of different methods could be used to determine if the engine is in an acceleration mode, including the exemplary method shown in FIGS. 4A-B.

Figure 4A:
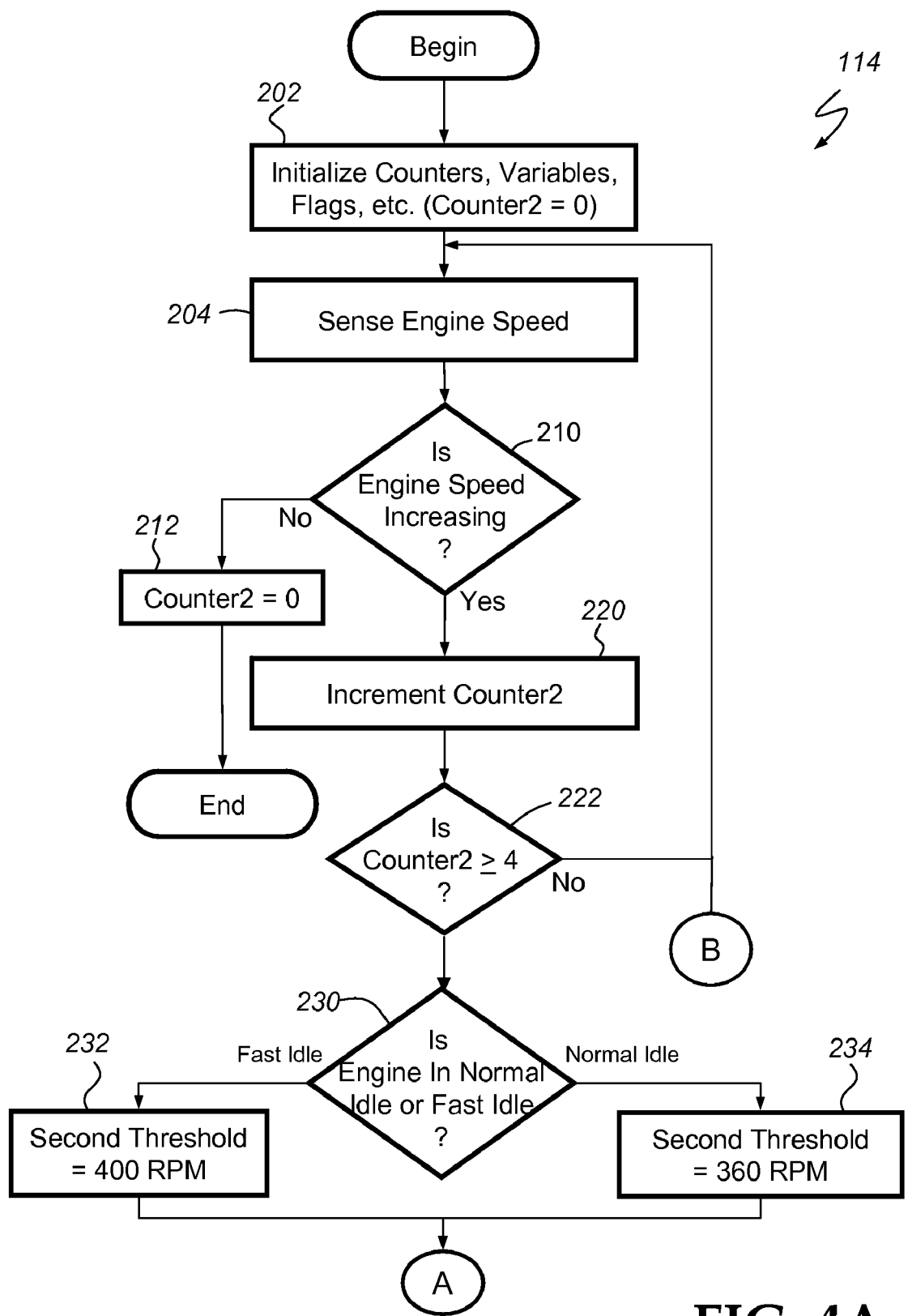
FIGS. 4A-B are flowcharts showing an exemplary embodiment of one of the steps in the method of FIG. 3, where the step determines if the engine is in an acceleration mode.
Figure 4B:
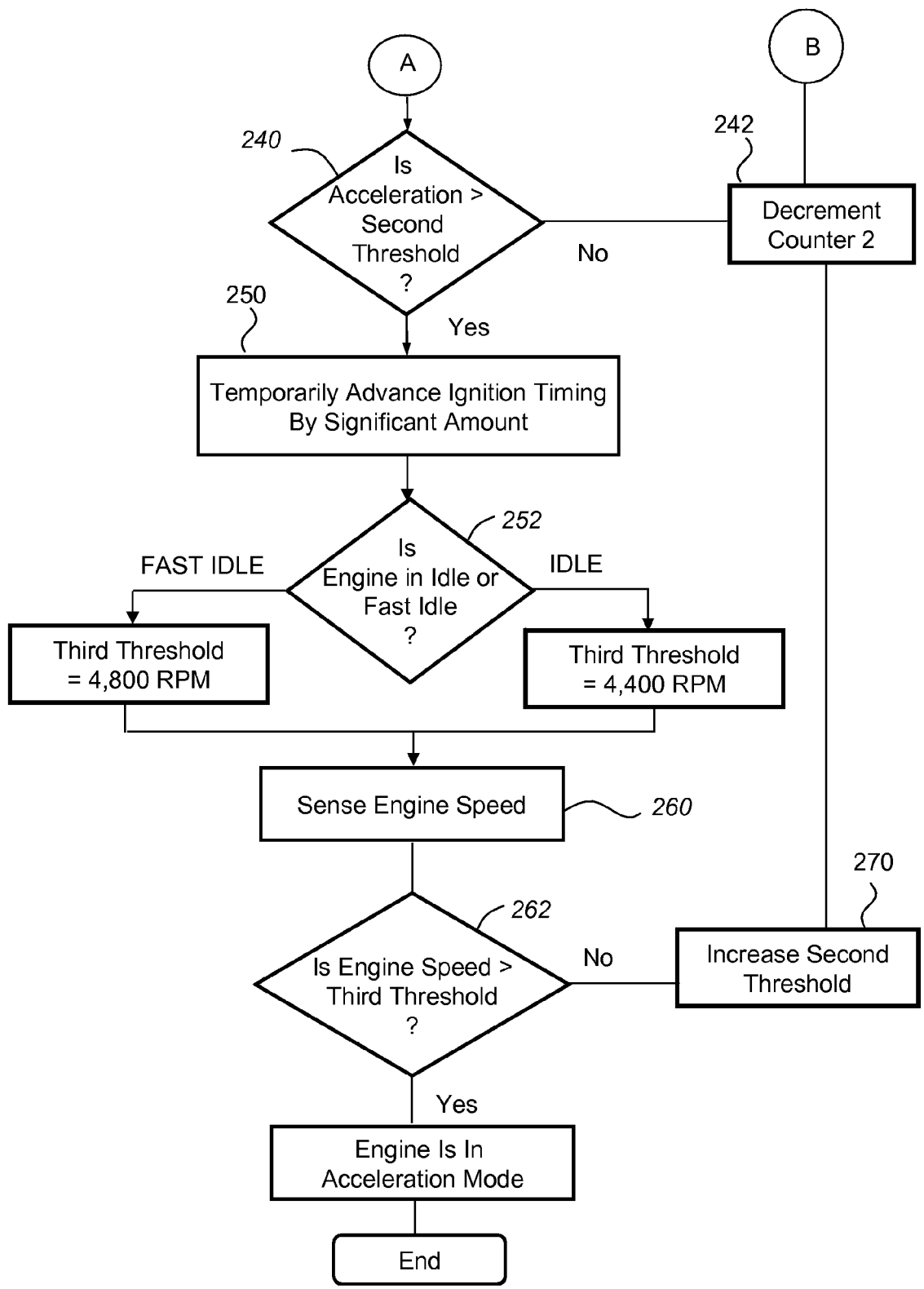

With reference to FIG. 4A, there is shown an exemplary embodiment of step 114, which may be used to determine if the engine is accelerating and thus determine if the operator is attempting to throttle or engage the engine. As before, one or more counters, variables, flags, etc. can be initialized in step 202. This includes another exemplary engine revolution counter (Counter2), which is set to '0'. Of course, other counters, variables, flags, etc. could also be set to some initial value.

Next, step 204 senses the engine speed. Successive engine speed signals are then compared to see if the engine speed is increasing, step 210. In this exemplary embodiment, step 210 compares the new engine speed reading (taken in step 204) to the most recent preceding engine speed reading. Of course, other methods could be used, including those that compare the engine speed reading of step 204 with some averaged engine speed reading or the like. If the answer to step 210 is 'no', then it is assumed that the engine is not in an acceleration mode. Step 212 resets Counter2 to '0', and step 114 is ended so that control can pass back to step 104 in FIG. 3. Although step 104 was previously described as activating the engine speed governor, in this case the governor is already activated. Thus, when control of the method returns to step 104, the engine speed governor may continue operating by sampling the engine speed and using the look-up table to determine a corresponding ignition timing value, as already explained.

If step 210 determines that the current engine speed is greater than one or more previous engine speeds, then step 220 increments Counter2 and step 222 compares the incremented value to a predetermined number of engine revolutions, such as '4'. If Counter2 has not yet reached the predetermined value, then control is returned to step 204 so that a new engine speed can be sensed and compared. Put differently, steps 204, 210, 220 and 222 continue to monitor and compare engine speed readings until four consecutive engine speed readings increase in speed. If, at any time, an engine speed reading does not increase in speed (i.e., does not accelerate), then Counter2 is reset at step 212 and step 114 is ended.

Next, step 230 checks to see if the light-duty combustion engine is in an idle mode or a fast idle mode. One way to perform this check is to review a history of the engine speed. For example, if the engine speed five revolutions ago was greater than 2,600 RPM, then step 230 may assume that the engine is in a fast idle mode; if the engine speed five revolutions ago was less than 2,600 RPM, then it is assumed that the engine is in a regular idle mode. One reason that step 230 may determine the idle mode status is to set a second threshold; the second threshold can be used to determine if the amount of recent engine acceleration is great enough to constitute an 'acceleration mode'. If the engine is deemed to be in a fast idle mode, then the second threshold is set higher than if it is in a normal idle mode.

To illustrate, assume that the engine was operating at a speed of 3,000 RPM five revolutions ago. With this information, step 230 can assume that the engine is currently in a fast idle mode, and step 232 could assign a second threshold value of 400 RPM, for example. This second threshold is generally representative of the amount of engine speed change—i.e., the amount of engine speed acceleration—that needs to occur in order for the engine to be considered to be in an 'acceleration mode'. If, on the other hand, the engine was only operating at 2,000 RPM five revolutions ago, then step 234 could assign a second threshold value of 360 RPM, for example. When the engine is in a normal idle mode, it is assigned a lower second threshold than when it is in a fast idle mode. It should be appreciated that more than two idle modes could be used, each of which could have its own second threshold, for example.

Step 240 then compares the recent change in engine speed to the second threshold, as determined by steps 232 or 234. Consider the example where the engine is in a normal idle mode (second threshold=360 RPM) and the engine has accelerated 375 RPM over the last four engine revolutions. Step 240 could conclude that the engine has accelerated by an amount that is sufficient to indicate that it is in an acceleration mode. If the engine is in a fast idle mode (second threshold=400 RPM) and still only accelerates 375 RPM, then step 240 could determine that although the engine has accelerated, the amount or degree of acceleration is insufficient to conclude that the engine is in acceleration mode. In this way, the bar or threshold may be set higher for engines operating in fast idle modes than those operating in normal idle modes. If the answer to step 240 is 'no', then Counter2 is decremented at step 242 and sent back to step 204. If the answer to step 240 is 'yes', then the method proceeds to step 250.

Step 250 temporarily advances the ignition timing of the engine so that the method can observe the engine's response. By temporarily advancing the ignition timing by a significant amount—e.g., advancing the timing to 28° BTDC for five revolutions—the method can determine if the operator is in fact engaging the throttle and attempting to operate the equipment. If the operator is engaging the throttle, a rapid and significant advancement in the ignition timing would likely cause the engine to speed up by a noticeable amount.

Step 252 checks the idle mode of the engine and sets a third threshold accordingly; this is similar to the approach taken in steps 230-234. The amount of engine speed increase due to the ignition timing advance will be compared to the third threshold. If the engine is in a fast idle mode, then step 254 may assign a third threshold value of 4,800 RPM, for example. If the engine is in a normal idle mode, then step 256 could assign a third threshold value of 4,400 RPM, for example. As before, it should be appreciated that more than two idle modes could be used, and each of which could have its own third threshold value.

Step 260 then senses the current engine speed so that it can be compared to the newly determined third threshold value, step 262. If the answer is 'no', then the engine responded to the temporary ignition timing advance in a way that suggests the operator is not engaging the throttle; i.e., a false acceleration. According to this particular embodiment, step 270 increases the second threshold of the two idle modes by a certain amount, say 20 RPM, each time step 262 results in a 'no' answer. This optional step makes it harder during subsequent passes for step 240 to result in a 'yes' result. In order to avoid a situation where the second threshold becomes too high, a maximum value such as 500 RPM could be established for the second threshold. Once the second threshold has been increased, control could pass back to step 204. If the answer to step 262 is 'yes' then it is assumed that the engine is in an acceleration mode and step 114 is complete.

In the foregoing exemplary embodiment, step 114 checks to see if the engine is in an acceleration mode by generally performing three separate checks. A first check determines if the engine speed increases for a certain number of consecutive engine revolutions (steps 204, 210, 220, 222). A second check compares the amount of acceleration to a second threshold—which may be determined by the idle mode status of the engine—in order to determine if the amount of acceleration is great enough (steps 230, 232, 234, 240). A third check purposely advances the ignition timing for a short amount of time in order to gauge the engine's response. If the engine responds by speeding up to a level that is greater than a third threshold, which is also determined by the current idle mode, then it is assumed that the engine is in an acceleration mode (steps 250, 252, 254, 256, 260, 262). It should be appreciated that this three-part check is only one exemplary method for determining if the engine is in an acceleration mode. It is possible to use different combinations of checks, including combinations having fewer, greater and/or different checks than those described above. For example, step 114 could check for the presence of an acceleration mode by using the first and second checks only, the first and third checks only, the second and third checks only, or any one of the three checks by themselves, to cite a few examples. Moreover, it is possible to combine one or more of these checks with some other checks, techniques, methods, etc. known in the art.

If step 114 determines that the light-duty combustion engine is in fact in an acceleration mode, then the engine speed governor is deactivated in step 120 and method 100 is ended. One or more steps, such as an ignition timing advance, could be taken before deactivating the engine speed governor. Moreover, there are a variety of ways in which the engine speed governor could be deactivated. In an exemplary embodiment, control system 12 simply begins controlling the ignition timing according to some other operating sequence, such as an acceleration mode sequence, etc. This is of course only one potential way to deactivate the engine speed governor, as any other deactivation method known in the art could be used as well.

Returning to step 110, if the sensed engine speed is greater than the first threshold (i.e., if the answer to step 110 is 'yes'), then step 130 increments Counter1 and step 132 checks to see if Counter1 is equal to or greater than a predetermined number, such as 25 in this example. If Counter1 has not yet reached the predetermined number, then control passes to the acceleration mode check of step 114, as already explained. If Counter1 has reached the predetermined number, then step 140 advances the ignition timing of the engine for a certain number of engine revolutions before deactivating the engine speed governor in step 120. In an exemplary embodiment, step 140 advances the ignition timing to 25° BTDC for 25 engine revolutions; this type of ignition timing advance can help the engine realize the acceleration being initiated by the operator before passing control of the engine to another operating sequence, for example. It should, of course, be appreciated that other ignition timing manipulations and techniques could be used.

As described above, there are several different exemplary ways in which the engine speed governor can be deactivated. A first way involves step 114 determining that the engine is in fact in an acceleration mode. As explained, this determination may include one of a number of combinations of checks, including the exemplary three-part check provided in FIGS. 4A-B. A second way involves step 132 determining that the engine has been operating at an elevated speed (i.e., a speed above the first threshold) for a certain number of engine revolutions. The exemplary embodiments described above are designed to deactivate the engine speed governor when an operator is attempting to throttle the engine, but avoid situations where the engine speed governor is deactivated prematurely. Other deactivation methods and techniques could be used as well.

The method previously explained is of an exemplary embodiment, and is intended to include variations which would be obvious to one skilled in the art. For instance, the values for engine speed used to determine the flow of control for the system could be an average engine speed calculated over a predetermined number of engine revolutions instead of a single reading. Also, the predetermined engine revolution values used for comparison could be modified to take into account various engine performance, environmental, and other considerations. Furthermore, the spark that initiates the combustion process may be generated by methods other than with a capacitive discharge ignition (CDI) system, such as a "flyback" type ignition system that provides a primary winding with sufficient current and suddenly halts the current such that the surrounding electromagnetic field collapses, thereby producing a high voltage ignition pulse in the secondary winding.

It is to be understood that the foregoing description is not a definition of the invention, but is a description of one or more preferred exemplary embodiments of the invention. The invention is not limited to the particular embodiment(s) disclosed herein, but rather is defined solely by the claims below Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having greater, fewer, or different steps than those shown could be used instead. All such embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a light-duty combustion engine, comprising the steps of:
   (a) activating an engine speed governor that limits the speed of the light-duty combustion engine;
   (b) limiting the speed of the light-duty combustion engine with the engine speed governor to a level that is less than a clutch-in speed of a centrifugal clutch;
   (c) sensing the speed of the light-duty combustion engine;
   (d) using at least two separate checks to determine if the light-duty combustion engine is in an acceleration mode, wherein at least one of the checks compares a plurality of successive engine speed signals to see if the engine speed increases for a certain number of engine revolutions; and
   (e) if the light-duty combustion engine is in an acceleration mode, then deactivating the engine speed governor so that the light-duty combustion engine can operate at a level that is greater than the clutch-in speed of the centrifugal clutch.

2. The method of claim 1, wherein step (a) further comprises activating an engine speed governor that limits the speed of the light-duty combustion engine by manipulating the engine ignition timing.

3. The method of claim 1, wherein step (b) further comprises limiting the speed of the light-duty combustion engine by using a significant ignition timing retard when the speed of the engine approaches a first threshold that is less than the clutch-in speed.

4. The method of claim 1, wherein at least one of the checks in step (d) comprises determining if the light-duty combustion engine is in an acceleration mode by sensing an increase in engine speed and comparing that increase to a second threshold to determine if the increase in engine speed exceeds a certain amount.

5. The method of claim 1, wherein step (e) further comprises deactivating the engine speed governor by controlling the engine ignition timing according to some other mode of operation.

6. The method of claim 1, wherein at least one of the checks in step (d) comprises determining if the light-duty combustion engine is operating at an engine speed that is greater than a first threshold for a certain number of engine revolutions, wherein the first threshold is less than the clutch-in speed.

7. The method of claim 6, wherein step (e) further comprises deactivating the engine speed governor if either the engine is operating at an engine speed that is greater than the first threshold for the certain number of engine revolutions, or if the engine is in an acceleration mode.

8. A method for controlling a light-duty combustion engine, comprising the steps of:
   (a) activating an engine speed governor that limits the speed of the light-duty combustion engine;
   (b) limiting the speed of the light-duty combustion engine with the engine speed governor to a level that is less than a clutch-in speed of a centrifugal clutch;
   (c) sensing the speed of the light-duty combustion engine;
   (d) determining if the light-duty combustion engine is in an acceleration mode by advancing the ignition timing of the engine and observing the response of the engine; and
   (e) if the light-duty combustion engine is in an acceleration mode, then deactivating the engine speed governor so that the light-duty combustion engine can operate at a level that is greater than the clutch-in speed of the centrifugal clutch.

9. A control system for use with a light-duty combustion engine, comprising:
   an ignition discharge capacitor that is coupled to a charge winding for receiving and storing a charge;
   an ignition switching device that is coupled to the ignition discharge capacitor and includes a signal input; and
   an electronic processing device that executes electronic instructions and includes a signal output coupled to the signal input of the ignition switching device, the signal output provides an ignition signal that causes the ignition switching device to discharge the ignition discharge capacitor according to an engine ignition timing;
   wherein following engine startup the control system activates an engine speed governor to limit the speed of the engine, and deactivates the engine speed governor if the control system senses with at least two separate checks that an operator is attempting to accelerate the engine, and at least one of the checks compares a plurality of successive engine speed signals to see if the engine speed increases for a certain number of engine revolutions.

10. The control system of claim 9, wherein the engine speed governor limits the speed of the light-duty combustion engine by manipulating the engine ignition timing.

11. The control system of claim 9, wherein the engine speed governor limits the speed of the light-duty combustion engine by using a significant ignition timing retard when the speed of the engine approaches a first threshold that is less than a clutch-in speed.

12. The control system of claim 9, wherein at least one of the two separate checks used by the control system to determine if the operator is attempting to accelerate the engine senses an increase in engine speed and compares that increase to a second threshold to determine if the increase in engine speed exceeds a certain amount.

13. The control system of claim 9, wherein the control system deactivates the engine speed governor by controlling the engine ignition timing according to some other mode of operation.

14. The control system of claim 9, wherein the control system deactivates the engine speed governor if the light-duty combustion engine is operating at an engine speed that is greater than a first threshold for a certain number of engine revolutions, wherein the first threshold is less than the clutch-in speed.

15. A control system for use with a light-duty combustion engine, comprising:
an ignition discharge capacitor that is coupled to a charge winding for receiving and storing a charge;
an ignition switching device that is coupled to the ignition discharge capacitor and includes a signal input; and
an electronic processing device that executes electronic instructions and includes a signal output coupled to the signal input of the ignition switching device, the signal output provides an ignition signal that causes the ignition switching device to discharge the ignition discharge capacitor according to an engine ignition timing;
wherein following engine startup the control system activates an engine speed governor to limit the speed of the engine, and deactivates the engine speed governor if the control system senses that an operator is attempting to accelerate the engine, and the control system determines if the operator is attempting to accelerate the engine by advancing the ignition timing of the engine and observing the response of the engine.

16. A method for controlling a light-duty combustion engine, comprising the steps of:
(a) activating an engine speed governor that limits the speed of the light-duty combustion engine;
(b) limiting the speed of the light-duty combustion engine with the engine speed governor to a level that is less than a clutch-in speed of a centrifugal clutch;
(c) sensing the speed of the light-duty combustion engine;
(d) using at least two separate checks to determine if the light-duty combustion engine is in an acceleration mode; and
(e) if the light-duty combustion engine is in an acceleration mode, then deactivating the engine speed governor so that the light-duty combustion engine can operate at a level that is greater than the clutch-in speed of the centrifugal clutch;
wherein step (d) further comprises determining if the light-duty combustion engine is in an acceleration mode by: i) comparing a plurality of successive engine speed signals to see if the engine speed increases for a certain number of engine revolutions, ii) comparing the change in engine speed to a second threshold, and iii) advancing the ignition timing of the engine and observing the response of the engine.

* * * * *